US011189970B2

(12) United States Patent
Liu et al.

(10) Patent No.: US 11,189,970 B2
(45) Date of Patent: Nov. 30, 2021

(54) CHIP SLOT AND NETWORK SYSTEM

(71) Applicant: HUAWEI TECHNOLOGIES CO., LTD., Guangdong (CN)

(72) Inventors: Tianren Liu, Shenzhen (CN); Kanghua Ou, Dongguan (CN); Yuanbin Cai, Dongguan (CN); Junwei Zhong, Dongguan (CN); Xianfeng Chen, Dongguan (CN); Feng Wang, Dongguan (CN); Zhiwei Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/904,849

(22) Filed: Jun. 18, 2020

(65) Prior Publication Data

US 2020/0321732 A1 Oct. 8, 2020

Related U.S. Application Data

(63) Continuation of application No. PCT/CN2018/092328, filed on Jun. 22, 2018.

(30) Foreign Application Priority Data

Dec. 19, 2017 (CN) ......................... 201721784967.9

(51) Int. Cl.
*H01R 24/00* (2011.01)
*H01R 13/6461* (2011.01)
(Continued)

(52) U.S. Cl.
CPC ....... *H01R 13/6461* (2013.01); *H01R 12/721* (2013.01); *H01R 13/10* (2013.01)

(58) Field of Classification Search
CPC ... H01R 13/10; H01R 13/6461; H01R 12/721
(Continued)

(56) References Cited

U.S. PATENT DOCUMENTS 4,298,237 A * 11/1981 Griffith .................. H01R 12/82 439/60
5,071,371 A * 12/1991 Harwath ............. H01R 12/721 439/637
(Continued)

FOREIGN PATENT DOCUMENTS

CN 201397924 Y 2/2010
CN 201638992 U 11/2010
(Continued)

*Primary Examiner* — Abdullah A Riyami
*Assistant Examiner* — Vladimir Imas
(74) *Attorney, Agent, or Firm* — Womble Bond Dickinson (US) LLP

(57) ABSTRACT

A chip slot is disclosed, which includes a slot, where a plurality of terminal groups are disposed in the slot, terminals in each terminal group include metal sheets that are symmetrically disposed on two opposite inner side walls of the slot, and each metal sheet has a bending pin that extends outside the slot; bending directions of bending pins on the terminals in each terminal group are same; and for any row of metal sheets in any two adjacent terminal groups, along an arrangement direction of the row of metal sheets, bending pins of the metal sheets in the adjacent terminal groups are alternately arranged on both sides of the row of metal sheets. The bending pins of the row of metal sheets are bent toward two different directions.

18 Claims, 6 Drawing Sheets

(51) Int. Cl.
*H01R 12/72* (2011.01)
*H01R 13/10* (2006.01)

(58) Field of Classification Search
USPC .......................................................... 439/630
See application file for complete search history.

(56) References Cited

U.S. PATENT DOCUMENTS

| | | | | | |
|---|---|---|---|---|---|
| 5,580,257 | A * | 12/1996 | Harwath | H01R 12/721 | 439/108 |
| 6,056,579 | A * | 5/2000 | Richards, III | H05K 7/1454 | 439/327 |
| 6,099,328 | A * | 8/2000 | Nelson | H01R 12/721 | 439/101 |
| 6,132,263 | A * | 10/2000 | Wu | H01R 12/727 | 439/733.1 |
| 6,309,254 | B1 * | 10/2001 | Korsunsky | H01R 12/721 | 439/60 |
| 7,210,955 | B2 * | 5/2007 | Ringler | H01R 12/585 | 439/381 |
| 8,118,625 | B2 * | 2/2012 | Tsai | H01R 12/52 | 439/885 |
| 8,231,411 | B1 * | 7/2012 | Westman | H01R 13/6471 | 439/607.05 |
| 8,403,689 | B2 * | 3/2013 | Li | H01R 13/639 | 439/160 |
| 8,482,932 | B2 * | 7/2013 | Tian | G06F 1/185 | 361/784 |
| 8,611,097 | B2 * | 12/2013 | Yin | G06F 1/189 | 361/753 |
| 8,814,604 | B2 * | 8/2014 | Liao | G06F 1/185 | 439/630 |
| 8,926,348 | B2 * | 1/2015 | Ma | H01R 12/88 | 439/160 |
| 9,022,809 | B2 * | 5/2015 | Tang | H01R 12/721 | 439/637 |
| 9,190,746 | B2 | 11/2015 | Crofoot et al. | | |
| 9,711,890 | B1 * | 7/2017 | Lai | H01R 12/737 | |
| 9,793,633 | B2 * | 10/2017 | Liao | H01R 12/721 | |
| 9,837,751 | B2 * | 12/2017 | Lai | H01R 12/716 | |
| 10,224,653 | B2 * | 3/2019 | Niu | H01R 13/645 | |
| 10,707,601 | B1 * | 7/2020 | Lai | G06F 1/1658 | |
| 10,944,192 | B2 * | 3/2021 | Zhong | H01R 13/6272 | |
| 2007/0296066 | A1 | 12/2007 | Shuey | | |
| 2010/0062649 | A1 * | 3/2010 | Wu | H01R 12/716 | 439/636 |
| 2012/0178301 | A1 * | 7/2012 | Cao | H05K 7/1431 | 439/631 |
| 2018/0090864 | A1 * | 3/2018 | Niu | H01R 13/645 | |
| 2020/0274274 | A1 * | 8/2020 | Tsou | H01R 12/737 | |

FOREIGN PATENT DOCUMENTS

| | | | |
|---|---|---|---|
| CN | 202259764 | U | 5/2012 |
| CN | 202454826 | U | 9/2012 |
| CN | 103000214 | A | 3/2013 |
| CN | 204088715 | U | 1/2015 |
| CN | 206461128 | U | 9/2017 |
| CN | 107482330 | A | 12/2017 |
| CN | 107658583 | A | 2/2018 |
| CN | 207705421 | U | 8/2018 |

* cited by examiner

CHIP SLOT AND NETWORK SYSTEM

CROSS-REFERENCE TO RELATED APPLICATIONS

This application is a continuation of International Application No. PCT/CN2018/092328, filed on Jun. 22, 2018, which claims priority to Chinese Patent Application No. 2017/21784967.9 filed on Dec. 19, 2017. The disclosures of the aforementioned applications are hereby incorporated by reference in their entireties.

TECHNICAL FIELD

This application relates to the field of communications technologies, and in particular, to a chip slot and a network system.

BACKGROUND

With an increasingly high transmission rate of a memory Double Data Rate (DDR) signal, a next generation DDR5 memory provides a double rate (from 3.2 Gbps to 6.4 Gbps), and SI (Signal Integrity) becomes increasingly important. In addition to SI capability improvement in an active electric circuit part, SI performance of a passive link between a CPU (Central Processing Unit) and a memory module is also crucial. Therefore, how to minimize impact such as crosstalk, reflection, and impedance on the passive link for transmitting a DDR signal is a focus of product engineering and application design.

A memory slot plays an important role in the passive link, and therefore a design of a pin size/form/pin arrangement (pin arrangement) directly affects the SI performance. If a signal pin S (Signal) and a ground pin G (GND) are arranged in a staggering manner in the memory module, an anti-crosstalk effect is good. However, in a terminal preparation process, there are a plurality of consecutive signal pins that are arranged together in the memory slot, and correspondingly PCB (Printed Circuit Board) pads are also arranged in a same manner. Consequently, signal crosstalk is comparatively large.

SUMMARY

This application provides a chip slot and a network system, to reduce crosstalk between signals and improve a signal transmission effect.

According to a first aspect, a chip slot is provided, and the chip slot includes a slot, where a plurality of terminal groups are disposed in the slot, terminals in each terminal group includes metal sheets that are symmetrically disposed on two opposite inner side walls of the slot, and each metal sheet has a bending pin that extends outside the slot;

bending directions of bending pins on the terminals in each terminal group are same; and for any row of metal sheets in any two adjacent terminal groups, along an arrangement direction of the row of metal sheets, bending pins of the metal sheets in the adjacent terminal groups are alternately arranged on both sides of the row of metal sheets.

In the foregoing technical solution, bending pins of a row of metal sheets are bent toward two different directions. Therefore, a spacing between the bending pins is increased, an electrical isolation effect between the bending pins is further improved, signal crosstalk between signals is reduced, and a signal transmission effect is improved.

In one embodiment, a longitudinal direction of the bending pin is perpendicular to an arrangement direction of the metal sheet. Therefore, the spacing between the bending pins is further increased, and the signal transmission effect is further improved.

In one embodiment, each terminal group includes at least two terminals. The terminals are grouped based on a function, so that a spacing between terminals having a same function is comparatively large, signal crosstalk is further avoided, and the signal transmission effect is further improved.

In one embodiment, each terminal group includes a first terminal and a second terminal.

In one embodiment, a pad is disposed at an end of the bending pin.

In one embodiment, solder is disposed on the pad at the bending pin.

In one embodiment, the pad is a circular pad.

In one embodiment, when the terminal group includes the first terminal and the second terminal, the pad has a protrusion structure protruding from the bending pin, and protruding directions of adjacent pads are opposite.

In one embodiment, quantities of terminals in the terminal groups are same.

According to a second aspect, a network system is provided, where the network system includes the chip slot according to any one of the foregoing aspect.

In the foregoing technical solutions, bending pins of a row of metal sheets are bent toward two different directions. Therefore, a spacing between the bending pins is increased, an electrical isolation effect between the bending pins is further improved, signal crosstalk between signals is reduced, and a signal transmission effect is improved.

DESCRIPTION OF EMBODIMENTS

To make the objectives, technical solutions, and advantages of this application clearer, the following further describes this application in detail with reference to the accompanying drawings.

To resolve signal crosstalk between terminals in a chip slot in the prior art, an embodiment of this application provides a chip slot. In the chip slot, an arrangement manner of bending pins on the terminals is changed, to increase a spacing between the bending pins, and further reduce signal crosstalk between the terminals. To help understand the chip slot provided in this embodiment of this application, the following describes the chip slot in detail with reference to specific accompanying drawings.

Figure 1:
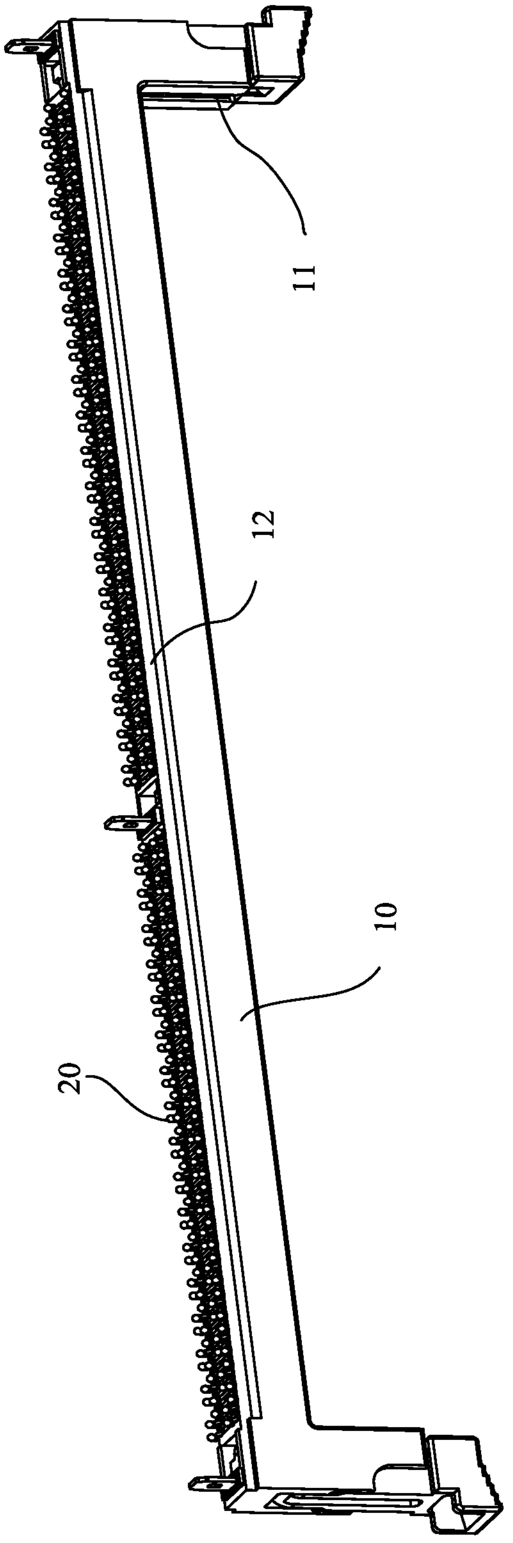
FIG. 1 is a schematic structural diagram of a slot according to an embodiment of this application.
Figure 2:
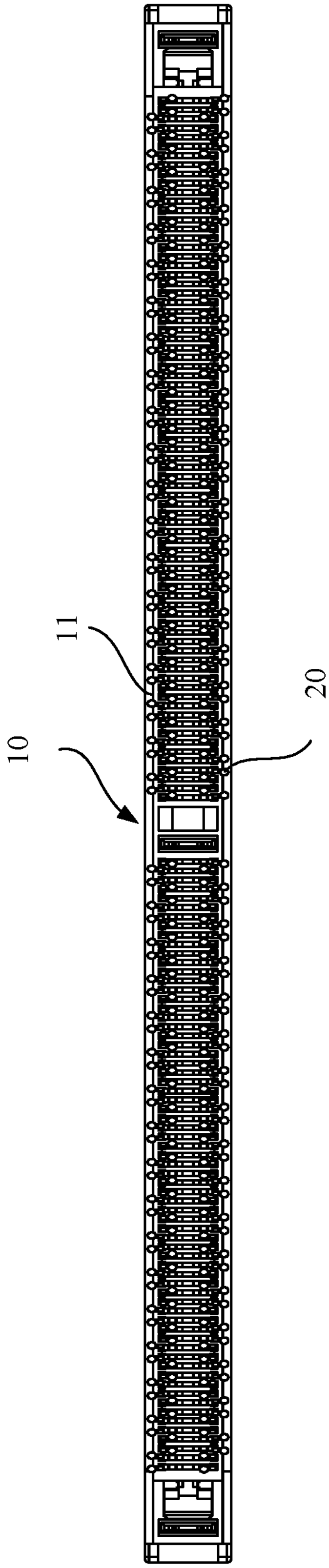
FIG. 2 is a bottom view of a slot according to an embodiment of this application.
Figure 4:
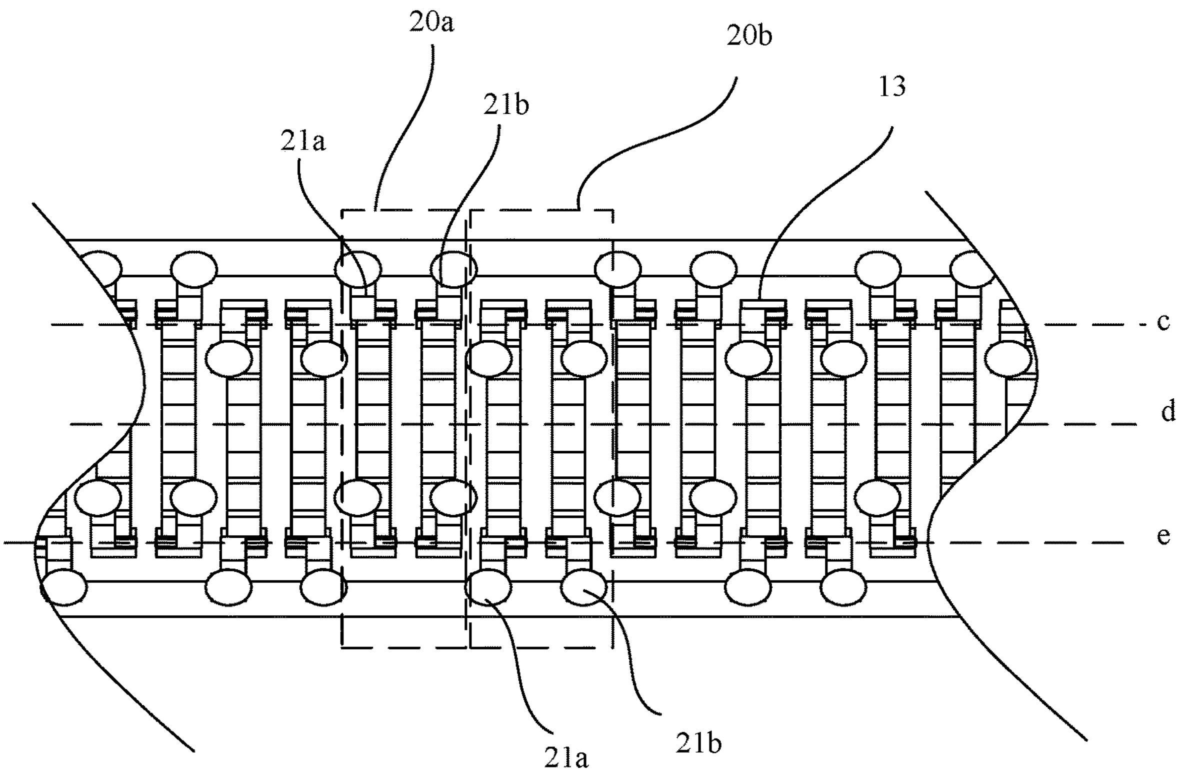
FIG. 4 is a schematic diagram of matching between a slot and a terminal according to an embodiment of this application.

FIG. 1 and FIG. 2 show a structure of a chip slot 10 according to an embodiment of this application. As shown in FIG. 1, the chip slot 10 includes two parts: a slot 10 and a terminal group 20. When the terminal group 20 is disposed, the terminal group 20 includes at least one terminal. For example, each terminal group 20 includes one terminal, or at least two terminals (two terminals, three terminals, or more terminals). During grouping, the terminals are grouped based on different functions, and quantities of terminals in different terminal groups 20 may be same or may be different. A structure shown in FIG. 4 is used as an example. The terminal group 20 includes a first terminal 21*a* and a second terminal 21*b*.

Figure 3:
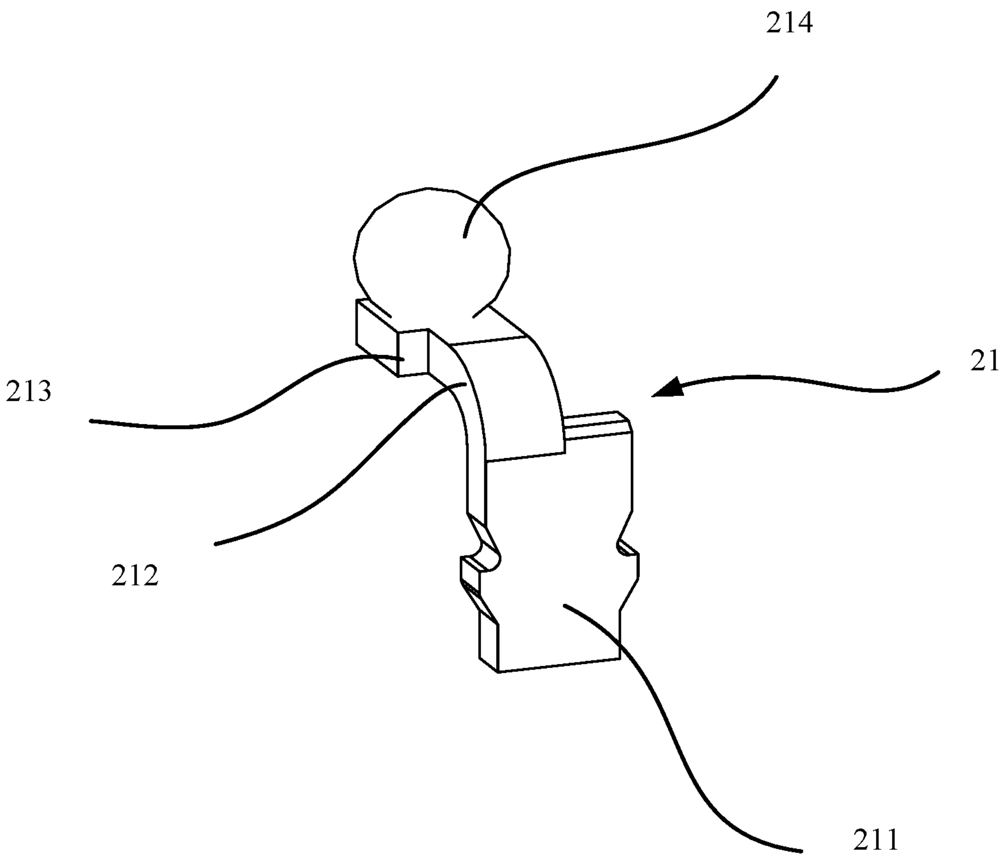
FIG. 3 is a schematic structural diagram of a terminal according to an embodiment of this application.

As shown in FIG. 3 and FIG. 4, each terminal includes two metal sheets 211, and the two metal sheets are referred to as a pair of metal sheets 211. As shown in FIG. 3, the metal sheet 211 has a bending pin 212, and the metal sheet 211 is located in the slot 10 and used to match an inserted chip. The bending pin 212 extends outside the slot 10, and is used to electrically connect the chip slot 10 to a circuit board. When the terminal is assembled with the slot 10, as shown in FIG. 1, a structure of the slot 10 includes a groove 11 and a physical structure carrying the groove 11. A through hole 13 is disposed at the bottom of the groove 11. During assembly, a pair of metal sheets are respectively disposed on two opposite inner side walls of the slot 10, that is, two opposite inner side walls of the groove 11, and bending pins pass through the through hole 13 and extend outside a bottom surface 12 of the slot 10.

Still referring to FIG. 3 and FIG. 4, during assembly, in one embodiment of this application, directions of bending pins on terminals in different terminal groups 20 are changed, and the bending pins extending outside the slot 10 are arranged in four rows, to increase a spacing between the bending pins corresponding to a same signal. As shown in FIG. 4, when a bending structure in each terminal group 20 is specifically disposed, bending directions of bending structures on the terminals are same. In terms of any two adjacent terminal groups, for any row of metal sheets in any terminal group 20, along an arrangement direction of the row of metal sheets, bending pins of metal sheets in the adjacent terminal groups 20 are alternately arranged on both sides of the row of metal sheets. Terminals shown in FIG. 4 are used as an example. FIG. 4 shows two terminal groups: a terminal group 20*a* and a terminal group 20*b*. The terminal group 20*a* includes a first terminal 21*a* and a second terminal 21*b*. The terminal group 20*b* includes a first terminal 21*a* and a second terminal 21*b*. The terminal group 20*a* and the terminal group 20*b* are alternately arranged (only one terminal group 20*a* and one terminal group 20*b* are illustrated in this figure). First, for the terminal group 20*a*, bending directions of bending pins of two metal sheets on the first terminal 21*a* included in the terminal group 20*a* are same, and are all upward bending directions (a placement direction of a slot shown in FIG. 4 is a reference direction). Bending directions of bending pins of two metal sheets on the second terminal 21*b* are the same as the bending directions of the bending pins on the first terminal 21*a*. In other words, for the terminal group 20*a*, bending directions of the bending pins included in the terminal group 20*a* are all same. Likewise, for the terminal group 20*b*, bending pins on the first terminal 21*a* and bending pins on the second terminal 21*b* included in the terminal group 20*b* also have a same direction, but the bending pins on both the first terminal 21*a* and the second terminal 21*b* in the terminal group 20*b* are bent downwards. In other words, bending directions of bending pins on terminals in two adjacent terminal groups are opposite. Therefore, four rows of bending pins are obtained on the bottom surface of the slot.

Still referring to FIG. 4, the four rows of pins are two rows of bending pins on the terminals in the terminal group 20*a*, and two rows of bending pins on the terminals in the terminal group 20*b*. As shown in FIG. 4, several auxiliary lines are introduced, to help describe the four rows of bending pins. An auxiliary line c is a straight line obtained by arranging one row of metal sheets, an auxiliary line e is a straight line obtained by arranging the other row of metal sheets, an auxiliary line d is a straight line between the auxiliary line c and the auxiliary line d, and a vertical distance from the auxiliary line d to the auxiliary line c is equal to a vertical distance from the auxiliary line d to the auxiliary line e. It can be learned from FIG. 4 that, for two rows of bending structures in the terminal group 20*a*, one row of bending structures are located on an upper side of the auxiliary line c, and the other row of bending structures are located on an upper side of the auxiliary line e. For two rows of bending structures in the terminal group 20*b*, one row of bending structures are located on a lower side of the auxiliary line c, and the other row of bending structures are located on a lower side of the auxiliary line e. In addition, for the two rows of bending structures located between the auxiliary line c and the auxiliary line e, one row of bending structures in the terminal group 20*a* and one row of bending structures in the terminal group 20*b* are distributed on both sides of the auxiliary line d. Therefore, there is a sufficient spacing between two relatively close rows of bending structures. In addition, the bending structures in the terminal group 20*a* are disposed in a same bending direction, so that the two rows of bending structures between the auxiliary line c and the auxiliary line e are disposed in a staggering manner. Therefore, a spacing between bending structures is increased to a greatest extent, a spacing between solder points is further increased when the bending structure is connected to the circuit board, and signal crosstalk between the terminals is reduced.

In addition, the manner of using the four rows of bending pins may increase the distance between the pins. In a specific example, compared with a manner of using two rows of pins, the manner of using the four rows of pins provided in this embodiment of this application increases a pin spacing from 0.85 mm to 1.25 mm, and increases a spacing between via-holes on the circuit board from 40 mil to 88 mil. In addition, ground sharing may be designed for a layout of the circuit board (ground sharing is implemented on the circuit board), to reduce crosstalk.

It should be noted that the chip slot provided in this application includes the slot and the two rows of metal sheets located in the slot. An extension direction of the row is the same as a longitudinal direction of the slot. The two rows of metal sheets are respectively disposed on two opposite inner side walls of the slot. The two rows of metal sheets are grouped into a plurality of terminal groups. Each terminal group includes a pair of metal sheets, the pair of metal sheets are symmetrically disposed in the slot, and the pair of metal sheets are respectively located in the two rows of metal sheets. In the solution provided in this application, bending directions of bending pins of a plurality of metal sheets located in a same terminal group are same. Assuming that the bending directions of the bending pins of the plurality of metal sheets located in the same terminal group are a bending direction corresponding to the terminal group, bending directions corresponding to two adjacent terminal groups are opposite. Further, a bending direction corresponding to each terminal group is perpendicular to a depth direction of the slot.

It should be noted that, as shown in FIG. 3, each metal sheet includes a main body 211 and a bending pin 212. The main body 211 and the bending pin 212 are usually integrated together. After the metal sheet is placed in the slot 10, the main body 211 is located in the slot 10, and the bending pin 212 passes through the through hole at the bottom of the slot 10 and extends outside the slot 10.

In an embodiment of this application, main bodies of all metal sheets that are located in two adjacent terminal groups and located in one row are located on a first straight line. It is known that the chip slot provided in this application includes the two rows of metal sheets, and the row of metal sheets described herein is one of the two rows of metal sheets. Bending pins of all metal sheets that are located in one terminal group and located in the row are located on one side of the first straight line, and bending pins of all metal sheets that are located in the other terminal group and located in the row of metal sheets are located on the other side of the first straight line. The side of the first straight line and the other side of the first straight line are two opposite sides.

In one embodiment, ends of the bending pins of all the metal sheets that are located in the terminal group and located in the row are located on a second straight line. Further, the second straight line is parallel to the first straight line.

In one embodiment, ends of the bending pins of all the metal sheets that are located in the other terminal group and located in the row of metal sheets are located on a third straight line. Further, the third straight line is parallel to the first straight line.

In another embodiment of this application, two adjacent pairs of metal sheets are respectively used to transmit different types of signals. Optionally, one of the two adjacent pairs of metal sheets are used to transmit a signal, and the other pair of metal sheets are used for grounding.

To further increase a spacing between terminals, terminals having a same function are disposed at an interval when the terminals are specifically disposed. Still referring to FIG. 4, each terminal group has a first terminal 21*a* and a second terminal 21*b*, and a function of the first terminal 21*a* is different from that of the second terminal 21*b*, for example, the first terminal 21*a* is a signal terminal, and the second terminal 21*b* is a grounding terminal. The terminal groups are arranged in an alternate manner, in other words, the first terminal 21*a*, the second terminal 21*b*, the first terminal 21*a*, the second terminal 21*b*, and so on are alternately arranged. Therefore, the spacing between the terminals having the same function is increased. In addition, as shown in FIG. 4, because the bending directions of the bending structures in the adjacent terminal groups are opposite, bending directions of bending structures on the terminals having the same function are opposite. Therefore, the spacing between solder points is increased when the terminals having the same function are welded onto the circuit board, the signal crosstalk is further reduced, and a signal transmission effect in the chip slot is improved.

It should be understood that, in the foregoing embodiment, only a case in which one terminal group has two terminals is described. Certainly, each terminal group may alternatively have different terminals such as three terminals or four terminals. When a bending structure is disposed, as shown in FIG. 4, a longitudinal direction of the bending pin is perpendicular to an arrangement direction of the metal sheet. However, when the bending structure is specifically disposed, the bending structure is not limited to the structure shown in FIG. 4. Alternatively, there may be a particular included angle between the bending structure and an auxiliary line. The structure shown in FIG. 4 is used as an example, and when a bending structure on the first terminal 21*a* is bent upwards relative to the auxiliary line c, the bending structure may tilt toward left/right. However, it should be understood that, when being specifically disposed, each row of bending structures should tilt toward a same direction, to ensure a spacing between the bending pins.

Figure 6:
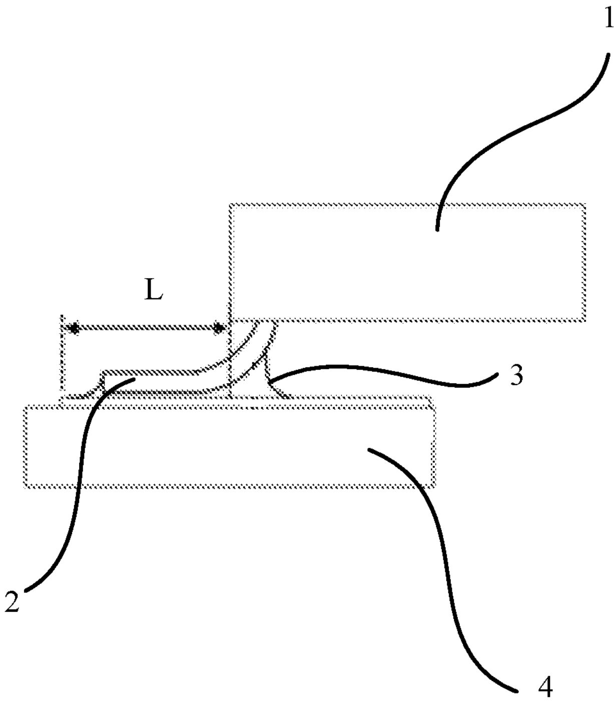
FIG. 6 is a schematic diagram of a connection between a chip slot and a circuit board in the prior art.
Figure 7:
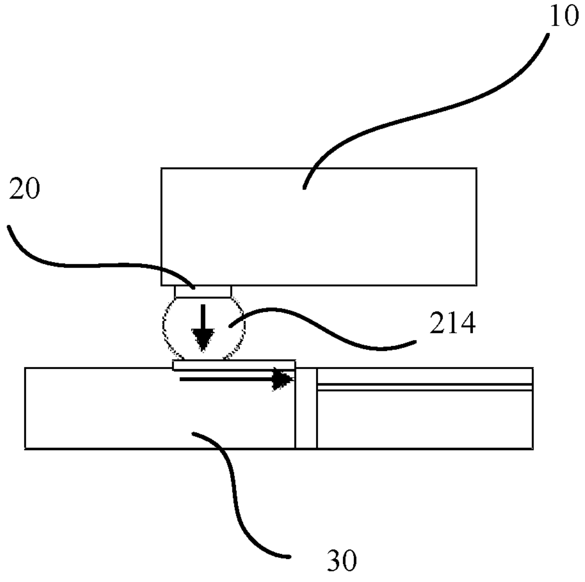
FIG. 7 is a schematic diagram of a connection between a chip slot and a circuit board according to an embodiment of this application.

When the chip slot is connected to the circuit board, the terminal in the chip slot is connected to the circuit board through welding. During welding, as shown in FIG. 3, a pad 213 is disposed at an end of each bending pin 212. The terminal touches the circuit board by using the pad 213, and is connected to the circuit board through tin soldering. Optionally, solder 214 is disposed on the pad 213, where the solder may be a soldering ball or cuboid solder. When the soldering ball is used, a BGA (Ball Grid Array) package is obtained. Therefore, signal reflection is avoided. For ease of understanding, refer to FIG. 6 and FIG. 7. FIG. 6 is a schematic connection diagram when a chip slot 1 is welded onto a circuit board 4 in the prior art, and FIG. 7 is a schematic connection diagram when a chip slot is welded onto a circuit board according to an embodiment of this application. As shown in FIG. 6, the chip slot 1 connects a pin 2 to the circuit board 4 by using a soldering tin 3. The bent pin 2 forms a stub (a place through which a signal does not pass), and a length of the pile line is L. There is a parasitic capacitor on the stub, and the parasitic capacitor reflects a signal. This affects a normal waveform of the signal. Consequently, a bit error is caused. As shown in FIG. 7, a chip slot 10 provided in this embodiment of this application is packaged by using the BGA pin packaging, during a specific connection, a terminal 20 is directly welded onto a circuit board 30 by using a soldering ball. During the welding, no stub is formed, and therefore no reflection problem arises. This further improves the signal transmission effect. In addition, when the BGA pin packaging is used, a welding effect can be greatly improved. A welding failure rate decreases from 1000 ppm to below 100 ppm, thereby greatly improving a product qualification ratio.

Figure 5:
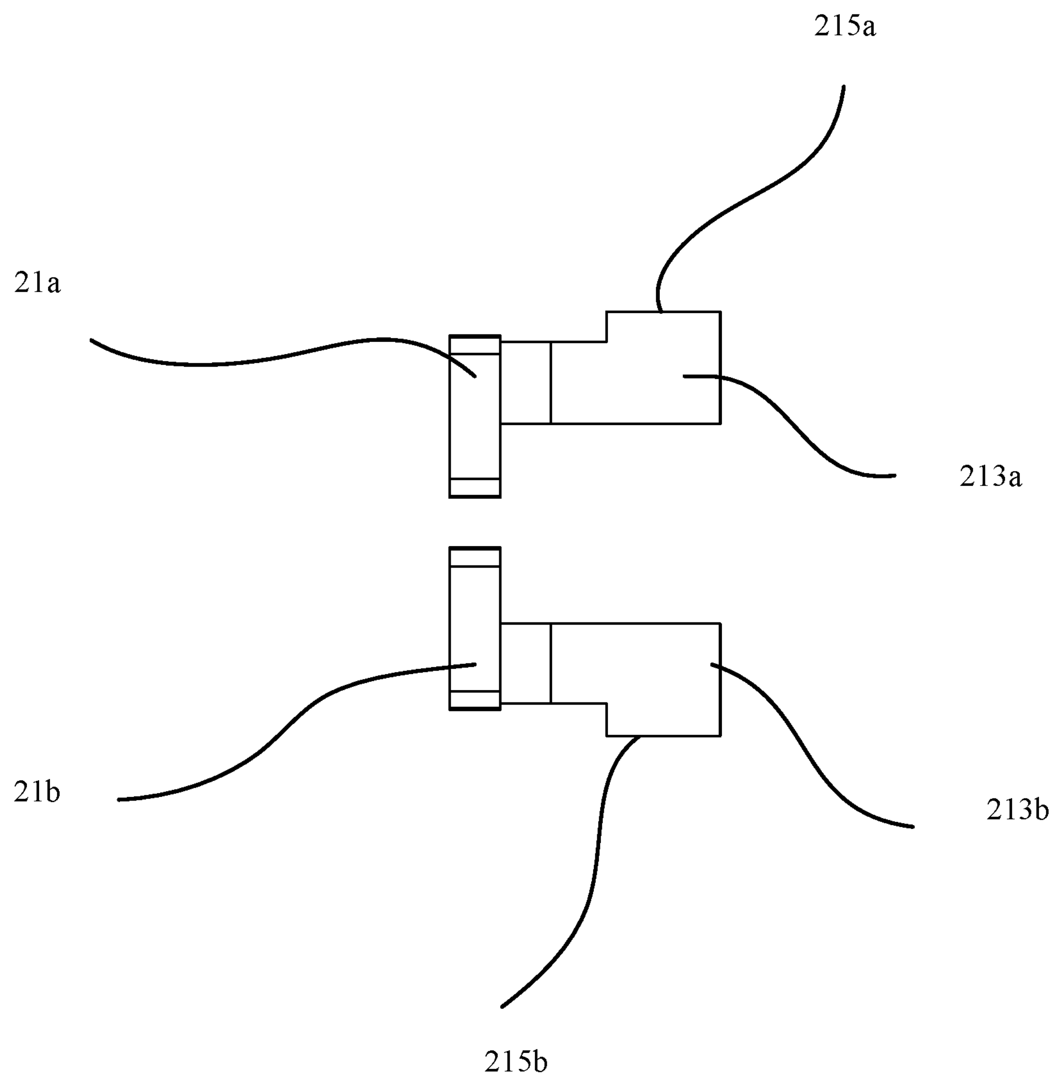
FIG. 5 is a schematic structural diagram of a bending pin on a terminal according to an embodiment of this application.

When a pad 213 is specifically disposed, a width of the pad 213 needs to be greater than a width of a bending pin 212, to facilitate placing ball and ensure connection strength. Therefore, when being specifically disposed, the pad 213 may be made in a circle shape, and a center of the circle is located on a center line in a longitudinal direction of the bending pin 212. Alternatively, in a specific implementation, a terminal group has two terminals, for example, as shown in FIG. 4 and FIG. 5, each terminal group has two terminals. Therefore, there are only two bending pins 212 in a same direction. When welding space is considered and the pad 213 is disposed, the pad 213 has a protrusion structure protruding from the bending pin 212, and protruding directions of adjacent pads 213 are opposite. A placement direction of the terminals shown in FIG. 5 is used as a reference direction, one pad is disposed upwards, and another pad is disposed downwards, so that a distance between the two pads 215 is increased. As shown in FIG. 5, an upper terminal is the first terminal 21*a*, and a lower terminal is the second terminal 21*b*. A first pad 213*a* on the first terminal 21*a* has an upward protrusion structure 215*a*, to increase an area of the first pad 213*a*, and a second pad 213*b* on the second terminal 21*b* has a downward protrusion structure 215*b* , to increase an area of the second pad 213*b*.

In addition, referring to FIG. 6 and FIG. 7, when the chip slot is disposed in the manner shown in FIG. 6, space between pins is comparatively small, and space occupied for a welding connection is comparatively large. Consequently, cabling cannot be performed on a surface, and all cables are disposed in the circuit board, causing a comparatively thick circuit board. A printed circuit board is used as an example. In this case, 26 layers of printed circuit boards are required. However, when a bending pin and the BGA pin packaging manner provided in this embodiment are used, cabling space may be formed between bending pins, and a cable that originally needs to be disposed inside the circuit board is disposed on a surface of the circuit board, thereby reducing a thickness of the circuit board. The printed circuit board is still used as an example. When the chip slot provided in this embodiment of this application is used, the thickness of the printed circuit board can be decreased to 24 layers. Therefore, costs of the printed circuit board are reduced.

This application further provides a network system. The network system may be a common communications network system such as a server. The network system includes the chip slot in any one of the foregoing embodiments. In the foregoing technical solutions, bending pins of a row of metal sheets are bent toward two different directions. Therefore, a spacing between the bending pins is increased, an electrical isolation effect between the bending pins is further improved, signal crosstalk between signals is reduced, and a signal transmission effect is improved.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A chip slot, comprising:

a slot having a plurality of terminal groups disposed therein, wherein each terminal group includes a plurality of terminals, the terminals including a plurality of metal sheets symmetrically disposed on two opposite inner side walls of the slot, and each metal sheet has a bending pin that extends outside the slot;

wherein bending directions of bending pins on the terminals in each terminal group are identical; and for any row of metal sheets in any two adjacent terminal groups, along an arrangement direction of the row of metal sheets, bending pins of the metal sheets in the adjacent terminal groups are alternately arranged on both sides of the row of metal sheets.

2. The chip slot according to claim 1, wherein a longitudinal direction of each of the bending pins is perpendicular to an arrangement direction of a corresponding metal sheet.

3. The chip slot according to claim 1, wherein each terminal group comprises at least two terminals.

4. The chip slot according to claim 3, wherein each terminal group comprises a first terminal and a second terminal.

5. The chip slot according to claim 1, wherein a pad is disposed at an end of the bending pin.

6. The chip slot according to claim 5, wherein solder is disposed on the pad corresponding to the bending pin.

7. The chip slot according to claim 5, wherein the pad is a circular pad.

8. The chip slot according to claim 5, wherein when a corresponding terminal group comprises a first terminal and a second terminal, the pad has a protrusion structure protruding from the bending pin, and protruding directions of adjacent pads are opposite.

9. The chip slot according to claim 5, wherein quantities of terminals in the terminal groups are identical.

10. A network system, comprising:

a chip slot having a slot, the slot including a plurality of terminal groups disposed therein, each terminal group including a plurality of terminals, each terminal comprising a plurality of metal sheets that are symmetrically disposed on two opposite inner side walls of the slot, and each metal sheet has a bending pin that extends outside the slot;

wherein bending directions of bending pins on the terminals in each terminal group are identical; and for any row of metal sheets in any two adjacent terminal groups, along an arrangement direction of the row of metal sheets, bending pins of the metal sheets in the adjacent terminal groups are alternately arranged on both sides of the row of metal sheets.

11. A chip slot, comprising:

a slot; and two rows of metal sheets located in the slot, wherein one row of metal sheets are disposed on a first inner side wall of the slot, the other row of metal sheets are disposed on a second inner side wall of the slot, the first inner side wall is opposite to the second inner side wall, and an extension direction of a long side of each of the first and second inner side walls is the same as a longitudinal direction of the slot;

wherein the two rows of metal sheets comprise a plurality of terminal groups, each terminal group comprises at least one pair of metal sheets, one metal sheet in each pair of metal sheets is located in the row, the other metal sheet is located in the other row, and each pair of metal sheets are symmetrically disposed in the slot; and wherein bending directions of bending pins of a plurality of metal sheets located in a same terminal group are identical, bending directions corresponding to two adjacent terminal groups are opposite, and a bending direction corresponding to a terminal group refers to bending directions of bending pins of a plurality of metal sheets located in the terminal group.

12. The chip slot according to claim 11, wherein a bending direction corresponding to each terminal group is perpendicular to a depth direction of the slot.

13. The chip slot according to claim 11, wherein main bodies of a plurality of metal sheets that are in the two adjacent terminal groups and located in the row are all located on a first straight line, a bending pin of at least one metal sheet that is in one terminal group and located in the row is located on one side of the first straight line, and a bending pin of at least one metal sheet that is in the other terminal group and located in the row is located on the other side of the first straight line.

14. The chip slot according to claim 13, wherein an end of the bending pin of the at least one metal sheet that is in the terminal group and located in the row is located on a second straight line, an end of the bending pin of the at least one metal sheet that is in the other terminal group and located in the row is located on a third straight line, and both the second straight line and the third straight line are parallel to the first straight line.

15. The chip slot according to claim 11, wherein two adjacent pairs of metal sheets are respectively used to transmit different types of signals.

16. The chip slot according to claim 15, wherein one of the two adjacent pairs of metal sheets are used to transmit a signal, and the other pair of metal sheets are used for grounding.

17. The chip slot according to claim 11, wherein an end of a bending pin of each metal sheet has a pad, and the pad has a protrusion structure.

18. The chip slot according to claim 17, wherein protrusion directions of protrusion structures of two adjacent metal sheets that are in the same terminal group and located in the row of metal sheets are opposite.

* * * * *